United States Patent Office 3,338,910
Patented Aug. 29, 1967

3,338,910
PIPERIDINE DERIVATIVES OF 1-HYDROCARBYL-4-ALKENYLENE-ISONIPECOTIC ACID ESTERS
Hans Herbert Kuhnis, Hugo Ryf, and Rolf Denss, Basel, Switzerland, assignors to Geigy Chemical Corporation, Greenburgh, N.Y., a corporation of Delaware
No Drawing. Filed July 5, 1966, Ser. No. 562,533
Claims priority, application Switzerland, Jan. 15, 1965, 604/65
21 Claims. (Cl. 260—294.3)

This application is a continuation-in-part of our pending patent application Ser. No. 520,093, filed Jan. 12, 1966, which is a continuation-in-part of our application Ser. No. 382,955, filed July 15, 1964.

This invention relates to new piperidine derivatives, which have valuable pharmaceutical properties, methods of treating pain and/or tussive irritation by means of these new compounds, as well as to analgesic and antitussive agents containing them.

More particularly, the invention concerns new piperidine derivatives of the formula

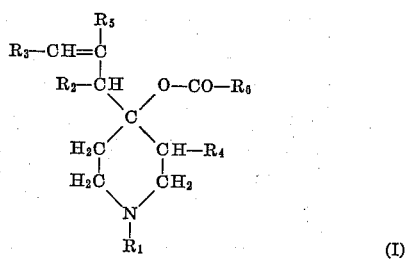

wherein
$R_1$ represents an alkyl or alkenyl radical having at most 8 carbon atoms, the cyclohexyl radical or an unsubstituted or substituted phenyl-alkyl radical having at most 9 carbon atoms, preferably an unsubstituted or substituted benzyl radical,
$R_2$, $R_4$ and $R_5$ each independently represent hydrogen or a methyl radical,
$R_3$ represents hydrogen, methyl or phenyl, and
$R_6$—CO— represents the acyl radical of a hydrocarbon carboxylic acid having at most 3 carbon atoms, preferably acetyl or propionyl.

Compounds according to the invention as well as their salts with inorganic and organic acids, have, on oral and also parenteral administration, central nervous depressant as well as antitussive and also analgesic activity, while not being liable to cause addiction, and are at the same time free from pharmaceutically unacceptable toxicity. They are thus suitable for reducing tussive irritation and also for the relief of pain of various origin.

More in particular, those of the compounds according to this aspect of the invention in which
$R_1$ is benzyl or alkyl of from 4 to 8 carbon atoms, preferably n-butyl or n-octyl, and in which
$R_2$, $R_4$ and $R_5$ are preferably hydrogen, are especially pronounced antitussives of mild analgesic activity.

Also useful as antitussive, but with slightly more pronounced analgesic activity are those compounds according to this aspect of the invention, in which $R_1$ represents propyl, phenylethyl or phenylpropyl, and in the case of the latter two, $R_6$—CO is acetyl or propionyl.

Analgesics of medium strength are especially those in which $R_1$ represents alkyl of from 1 to 3 carbon atoms, or allyl; and, as second choice, in the order of importance, the above-mentioned compounds in which $R_1$ is phenylethyl or phenylpropyl.

Included in the above group are a few compounds, more particularly those in which $R_1$ is phenylethyl and $R_6$—CO is acetyl, which are strong analgesics. They are preferably administered parenterally.

It is well known that N-substituted 4-hydroxy-4-phenylethynyl-and 4-acyloxy-4-propynyl-piperidines show pronounced pharmacological activity of a general central nervous depressant type and are reported to have an analgesic activity which is not of the morphine-type; and that a few of them appear also to be useful as antitussives.

This activity on the central nervous system appears to be adscribable to the electronic configuration of a $C\equiv C$ bond in the respective substituents in 4-position at the piperidine nucleus, for it is also known that reduction, e.g. of the phenylethynyl to the cis- and trans-styryl analogs results in loss of the central nervous effects.

It is, therefore, unexpected that in the case of the compounds according to this aspect of the invention which are allyl analogs of the above mentioned 4-propynyl-substituted piperidines, no such loss, but on the contrary, very pronounced activity on the central nervous system is found.

In the compounds of general Formula I and the starting materials therefor which are given below, $R_1$ represents, for example, alkyl radicals such as the methyl, ethyl, n-propyl, isopropyl, n-butyl, isobutyl, sec. butyl, n-amyl, isoamyl, n-hexyl or n-octyl radical; alkenyl radicals such as the allyl, crotyl or methallyl radical; the cyclohexyl radical, a phenyl alkyl radical such as the benzyl, 2-phenylethyl or 3-phenylpropyl radical. Substituted phenyl alkyl radicals are, e.g. halogenobenzyl, especially chlorobenzyl, fluorobenzyl and bromobenzyl; lower alkoxy-benzyl; lower alkylbenzyl and 3,4-methylenedioxy-benzyl; as well as the phenyl-ethyl and phenyl-propyl radicals bearing the substituents named in the foregoing for benzyl.

The term "lower" used in this specification and the appended claims in connection with an aliphatic radical means that such radical has from 1 to 4 carbon atoms.

The radical $R_6$—CO— is the acyl radical of acetic acid or propionic acid.

To produce the compounds of general Formula I, a compound of the general Formula II

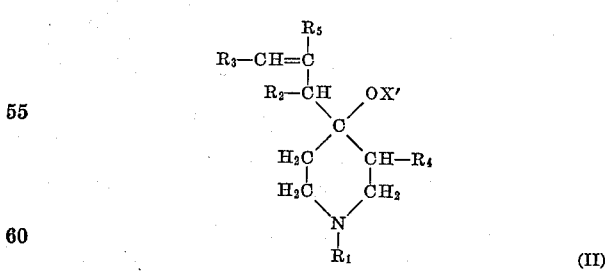

wherein X' represents hydrogen, a monovalent cation or the normal equivalent of a polyvalent cation, particularly a metal ion, and $R_1$, $R_2$, $R_3$, $R_4$ and $R_5$ have the meanings given hereinbefore, is reacted with a reactive functional derivative of a carboxylic acid of the general formula

$$R_6\text{—CO—OH} \quad \text{(III)}$$

or, if X′ is a hydrogen atom, also with the free acid or, optionally, with a corresponding ketene. For example, a hydroxy compound or metal compound thereof embraced by general Formula II is treated with a halide, cyanide, anhydride or mixed anhydride of a carboxylic acid of the general Formula III.

Starting materials of the general Formula II are obtained by reacting 4-piperidones of the general formula

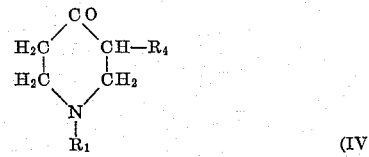
(IV)

wherein $R_1$ and $R_4$ have the meanings given above and of which some representatives are known and others can be produced analogously, with metal-organic compounds which contain the optionally halogen-substituted alkenyl radical of general Formula V

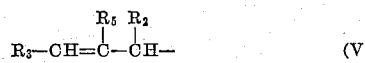
(V)

wherein $R_2$, $R_3$ and $R_5$ have the meanings given above, in particular with corresponding alkenyl magnesium halides in ethereal solvents according to Grignard. Compounds of the general Formula II wherein X′ is —Mg-halogen are obtained as immediate reaction products. These are preferably reacted direct with reactive functional derivatives of carboxylic acids of the general Formula III, i.e. instead of reacting the solution obtained of the product of the Grignard reaction in diethyl ether or another ethereal solvent in the usual way, a reactive functional derivative of a carboxylic acid of general Formula III, preferably dissolved in an inert anhydrous organic solvent such as benzene or tetrahydrofuran, is added thereto and the mixture is heated, if necessary while distilling off a low boiling solvent of the Grignard reaction, until the reaction is complete.

In addition, free hydroxy compounds of the general Formula II wherein $R_5$ is hydrogen can also be produced by partial hydrogenation of the triple bond of the hydroxy compounds of general Formula VII mentioned below. This is done analogously to the second process mentioned for the production of end products of general Formula I. In this way, for example, by hydrogenation of 1-substituted 4-(2′-butinyl)-4-piperidinols, also the correspondingly substituted 4-(2′-butenyl)-4-piperidinols are obtained, whilst on reacting 2-butenyl-magnesium halides with piperidones of the general Formula IV, due to allyl rearrangement, 1-substituted 4-(1′-methylallyl)-4-piperidinols are obtained.

In the acylation of free hydroxy compounds of the general Formula II, anhydrides and halides of low alkanoic acids in excess can serve at the same time as reaction medium; other acylating agents are used in inert organic solvents such as diethyl ether, tetrahydrofuran or benzene. If desired, an acid binding agent, e.g. a tertiary organic base such as pyridine or triethylamine, can be added but it is not necessary for a complete reaction. Compounds of general Formula II wherein X′ is hydrogen are acylated at temperatures from 0° to about 100° as the corresponding starting materials of general Formula II are tertiary hydroxy compounds which very easily split off water on reaction with acylating agents at still higher temperatures.

Compounds of the general Formual I wherein $R_5$ is hydrogen and $R_2$ and $R_3$ are hydrogen or methyl radicals are produced by a second process by treating compounds of the general formula

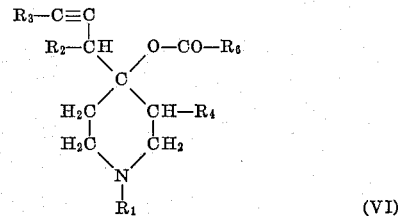
(VI)

wherein $R_1$, $R_2$, $R_3$, $R_4$ and $R_6$—CO— have the meanings given above, with hydrogen until the equimolar amount has been taken up, the treatment being performed in the presence of a catalyst suitable for the partial hydrogenation of triple bonds. As catalyst, e.g. palladium —CaCO$_3$-lead acetate in ethanol, partially deactivated in situ by the addition of quinoline, is used (Lindlar catalyst, cf. Helv. Chim. Acta 30, 1923 (1947)).

The starting materials of general Formula VI are obtained, e.g., by acylating hydroxy compounds of the general formula

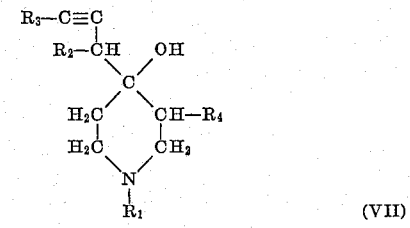
(VII)

wherein $R_1$, $R_2$, $R_3$ and $R_4$ have the meanings given above; the acylation can be performed completely analogously to that of free hydroxy compounds or metal compounds of the general Formula II. Some representative compounds of general Formula VII containing hydrogen as $R_2$, $R_3$ and $R_4$ are described in French Patent 665 M and other can be produced in the manner described therein, i.e. by reacting propargyl bromide with activated magnesium, zinc or aluminium in a mixture of tetrahydrofuran and toluene and condensing the metal-organic compound formed with a 4-piperidone of the general Formula IV. Instead of propargyl bromide, analogous compounds can also be used which produce compounds of the general Formula VII containing a methyl group as radical $R_2$ and/or $R_3$. The process described in the above French patent is advantageously modified by using coarse aluminium turnings which are first amalgamated by means of metallic mercury and then treated with mercury chloride instead of such powder simply activated with mercury chloride.

The new piperidine derivatives can be administered orally, rectally or parenterally. The daily dosages of the free bases or of non-toxic salts thereof vary between 1 and 800 mg. for adult patients. Suitable dosage units such as dragées (sugar coated tablets), tablets, suppositories or ampoules preferably contain 1–200 mg. of a piperidine derivative which can be produced according to the invention or of a non-toxic salt thereof as active substance.

By non-toxic salts of the bases usable according to the invention are meant salts with those acids the anions of which are pharmacologically acceptable in the usual dosages, i.e. they have no toxic effects. It is also of advantage if the salts to be used crystallise well and are not or are only slightly hygroscopic. Examples of non-toxic salts are the salts with hydrochloric acid, hydrobromic acid, sulphuric acid, phosphoric acid, methane sulphonic acid, ethane sulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenylacetic acid, mandelic acid and embonic acid.

Dosage units for oral administration preferably contain between 1% and 90% of a piperidine derivative of the general Formula I or a non-toxic salt thereof as active substance. They are produced by working up the active substance into tablets or dragée cores with, e.g. solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (Carbowaxes) of suitable molecular weights. The dragée cores are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

In addition, for the treatment of coughs in particular, also, for example, lozenges as well as liquid forms for oral administration such as cough syrups prepared with the usual auxiliaries, and drops can be considered.

Dosage units for rectal administration are, e.g. suppositories which consist of a combination of a piperidine derivative of the general Formula I or a suitable salt thereof with a neutral fatty foundation, or also gelatine rectal capsules which contain a combination of the active substance or a suitable salt thereof with polyethylene glycols (Carbowaxes) of suitable molecular weight.

Ampoules for parenteral, particularly intramuscular, administration preferably contain a water soluble salt of a piperidine derivative of general Formula I in a concentration of, preferably, 0.5–5%, optionally together with suitable stabilising agents and buffer substances, in aqueous solution.

The following prescriptions further illustrate the production of tablets and dragées:

(a) 250 g. of 1-methyl-4-allyl-4-acetoxy-piperidine hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. The tablets can be grooved if desired for better adaptation of the dosage.

(b) A granulate is produced from 250 g. of 1-methyl-4-allyl-4-acetoxy-piperdine hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the whole is pressed into 10,000 dragée cores. These are then coated with a concentrated syrup made of 522.28 g. of crystalline saccharose, 6 g. of shellack, 10 g. of gum arabic, 215 g. of talcum, 15 g. of colloidal silicon dioxide, 0.22 g. of dyestuff and 1.5 g. of titanium dioxide and dried. The dragées obtained each weigh 145 mg. and contain 25 mg. of active substance.

(c) To produce a cough syrup, 20 g. of 1-methyl-4-allyl-4-acetoxy-piperidine hydrochloride, 42 g. of p-hydroxybenzoic acid methyl ester, 18 g. of p-hydroxybenzoic acid propyl ester and 5,000 g. of crystallised sugar and also any flavouring desired are dissolved in distilled water up to 10 litres.

(d) To produce drops for the treatment of coughs, 500 g. of 1-methyl-4-allyl-4-acetoxy-piperidine hydrochloride, 10 g. of ascorbic acid, sweetener, e.g. 5 g. of sodium cyclamate, flavouring as desired and 2,500 g. of sorbitol (70%) are dissolved in distilled water up to 10 litres.

The following non-limitative examples illustrate the invention further. Percentages in the preceding specification and in these examples are given by weight. The temperatures are given in degrees centigrade.

Example 1

10.2 g. of magnesium filings in 30 ml. of abs. ether are placed in a 750 ml. four-necked flask and a little allyl bromide is added dropwise while stirring. As soon as the reaction has begun, 100 ml. of abs. ether are added and 50.8 g. of allyl bromide are added dropwise in such a way that the ether remains boiling under reflux and then the whole is stirred for another 10 minutes. 28.2 g. of 1-propyl-4-piperidone in 50 ml. of abs. ether are then added dropwise, the whole is refluxed for 15 minutes, heating is interrupted and 109.2 g. of propionic acid anhydride in 70 ml. of abs. benzene are added dropwise. The yellowish suspension is then refluxed for 6 hours, poured onto ice, made acid with concentrated hydrochloric acid and the organic phase is extracted three times with 6 N hydrochloric acid. The combined acid extracts are made alkaline with concentrated ammonia, extracted four times with chloroform, dried, concentrated and distilled. The 1-propyl-4-allyl-4-propionoxy-piperidine boils at 88°/0.04 torr. The hydrochloride is produced therefrom with ethereal hydrochloric acid in abs. ether. It melts at 225–226° (recrystallised from isopropanol/ether).

The following compounds are produced in the same way:

1-propyl-4-allyl-4-acetoxy-piperidine, B.P. 75°/0.03 torr, hydrochloride, M.P. 227°;
1-methyl-4-allyl-4-propionoxy-piperidine, B.P. 70–75°/0.06 torr, hydrochloride, M.P. 157–158°;
1-methyl-4-allyl-4-acetoxy-piperidine, B.P. 59–65°/0.05 torr, hydrochloride, M.P. 167–168°;
1-(2'-phenylethyl)-4-allyl-4-acetoxy-piperidine, M.P. 136–140°/0.02 torr, hydrochloride, M.P. 246°;
1-(2'-phenylethyl)-4-allyl-4-propionoxy-piperidine, B.P. 152°/0.05 torr, hydrochloride, M.P. 228–230°;
1-(3'-phenylpropyl)-4-allyl-4-acetoxy-piperidine, B.P. 149–154°/0.05 torr, hydrochloride, M.P. 182–183°;
1-(3'-phenylpropyl)-4-allyl-4-propionoxy-piperidine, B.P. 144–160°/0.01 torr, hydrochloride, M.P. 148–149°;
1-ethyl-4-allyl-4-propionoxy-piperidine, B.P. 71–72°/0.01 torr, hydrochloride M.P. 176–177°, citrate, M.P. 173–174°;
1-ethyl-4-allyl-4-acetoxy-piperidine, B.P. 70°/0.01 torr, hydrochloride M.P. 183°, citrate M.P. 158°;
1,4-diallyl-4-acetoxy-piperidine, B.P. 65–66°/0.015 torr, hydrochloride, M.P. 173–174°;
1,4-diallyl-4-propionoxy-piperidine, B.P. 87–90°/0.05 torr, hydrochloride, M.P. 205–207°;
1-benzyl-4-allyl-4-acetoxy-piperidine, hydrochloride, M.P. 197–198°;
1-n-butyl-4-allyl-4-acetoxy-piperidine, hydrochloride, M.P. 238°;
1-n-butyl-4-allyl-4-propionoxy-piperidine, hydrochloride, M.P. 222°;
1-cyclohexyl-4-allyl-4-acetoxy-piperidine, hydrochloride, M.P. 250°;
1-cyclohexyl-4-allyl-4-propionoxy-piperidine, hydrochloride, M.P. 234°;
1-n-octyl-4-allyl-4-acetoxy-piperidine, hydrochloride, M.P. 221–222°;
1-n-octyl-4-allyl-4-propionoxy-piperidine, hydrochloride, M.P. 196–197°;
1-isopropyl-4-allyl-4-acetoxy-piperidine, hydrochloride, M.P. 220°;
1-isopropyl-4-allyl-4-propionoxy-piperidine, hydrochloride, M.P. 198–199°;
1-(2'-phenyl-ethyl)-3-methyl-4-allyl-4-acetoxy-piperidine, maleate, M.P. 130–131°;
1-(2'-phenyl-ethyl)-3-methyl-4-allyl-4-propionoxy-piperidine, maleate, M.P. 117–118°, and
1-methyl-4-(2'-butenyl)-4-acetoxy-piperidine, citrate, M.P. 192–193°;

1-(p-methoxybenzyl)-4-allyl-4-acetoxy-piperidine, hydrochloride;
1-(p-methoxybenzyl)-4-allyl-4-propionoxy-piperidine, hydrochloride;
1-(3,4-dimethoxybenzyl)-4-allyl-4-acetoxy-piperidine, hydrochloride;
1-(3,4-dimethoxybenzyl)-4-allyl-4-propionoxy-piperidine, hydrochloride;
1-(3,4,5-trimethoxybenzyl)-4-allyl-4-acetoxy-piperidine, hydrochloride;
1-(3,4,5-trimethoxybenzyl)-4-allyl-4-propionoxy-piperidine, hydrochloride;
1-(p-methylbenzyl)-4-allyl-4-acetoxy-piperidine, hydrochloride;
1-(p-methylbenzyl)-4-allyl-4-propionoxy-piperidine, hydrochloride;
1-(m-methylbenzyl)-4-allyl-4-acetoxy-piperidine, hydrochloride;
1-(m-methylbenzyl)-4-allyl-4-propionoxy-piperidine, hydrochloride;
1-(o-methylbenzyl)-4-allyl-4-acetoxy-piperidine, hydrochloride;
1-(o-methylbenzyl)-4-allyl-4-propionoxy-piperidine, hydrochloride;
1-(2,3-dimethylbenzyl)-4-allyl-4-acetoxy-piperidine, hydrochloride;
1-(2,3-dimethylbenzyl)-4-allyl-4-propionoxy-piperidine, hydrochloride;
1-(3,4-dimethylbenzyl)-4-allyl-4-acetoxy-piperidine, hydrochloride;
1-(3,4-dimethylbenzyl)-4-allyl-4-propionoxy-piperidine, hydrochloride;
1-(2,6-dimethylbenzyl)-4-allyl-4-acetoxy-piperidine, hydrochloride;
1-(2,6-dimethylbenzyl)-4-allyl-4-propionoxy-piperidine, hydrochloride;
1-(2,4,6-trimethylbenzyl)-4-allyl-acetoxy-piperidine, hydrochloride;
1-(2,4,6-trimethylbenzyl)-4-allyl-4-propionoxy-piperidine, hydrochloride;
1-(3,4-methylenedioxybenzyl)-4-allyl-4-acetoxy-piperidine, hydrochloride;
1-(3,4-methylenedioxybenzyl)-4-allyl-4-propionoxy-piperidine, hydrochloride;
1-(p-chlorobenzyl)-4-allyl-4-acetoxy-piperidine, hydrochloride;
1-(p-chlorobenzyl)-4-allyl-4-propionoxy-piperidine, hydrochloride;
1-(2,4-dichlorobenzyl)-4-allyl-4-acetoxy-piperidine, hydrochloride;
1-(2,4-dichlorobenzyl)-4-allyl-4-propionoxy-piperidine, hydrochloride;
1-(2,6-dichlorobenzyl)-4-allyl-4-acetoxy-piperidine, hydrochloride;
1-(2,6-dichlorobenzyl)-4-allyl-4-propionoxy-piperidine, hydrochloride;
1-(p-fluorobenzyl)-4-allyl-4-acetoxy-piperidine, hydrochloride;
1-(p-fluorobenzyl)-4-allyl-4-propionoxy-piperidine, hydrochloride;
1-(2,6-dichloro-3-methylbenzyl)-4-allyl-4-acetoxy-piperidine, hydrochloride;
1-(2,6-dichloro-3-methylbenzyl)-4-allyl-4-propionoxy-piperidine, hydrochloride;
1-(p-bromobenzyl)-4-allyl-4-acetoxy-piperidine, hydrochloride;
1-(p-bromobenzyl)-4-allyl-4-propionoxy-piperidine, hydrochloride;
1-(p-methoxyphenethyl)-4-allyl-4-acetoxy-piperidine, hydrochloride;
1-(p-methoxyphenethyl)-4-allyl-4-propionoxy-piperidine, hydrochloride;
1-(3,4-dimethoxyphenethyl)-4-allyl-4-propionoxy-piperidine, hydrochloride;
1-(3,4,5-trimethoxyphenethyl)-4-allyl-4-propionoxy-piperidine, hydrochloride;
1-(p-methylphenethyl)-4-allyl-4-acetoxy-piperidine, hydrochloride;
1-(p-methylphenethyl)-4-allyl-4-propionoxy-piperidine, hydrochloride;
1-(o-methylphenethyl)-4-allyl-4-propionoxy-piperidine, hydrochloride;
1-(3,4-methylenedioxyphenethyl)-4-allyl-4-propionoxy-piperidine, hydrochloride;
1-(p-chlorophenethyl)-4-allyl-4-acetoxy-piperidine, hydrochloride;
1-(p-chlorophenethyl)-4-allyl-propionoxy-piperidine, hydrochloride;
1-(2,4-dichlorophenethyl)-4-allyl-4-propionoxy-piperidine, hydrochloride;
1-(p-fluorophenethyl)-4-allyl-4-propionoxy-piperidine, hydrochloride;
1-(p-bromophenethyl)-4-allyl-propionoxy-piperidine, hydrochloride;
1-[3-(p-methoxyphenyl)-propyl]-4-allyl-4-acetoxy-piperidine, hydrochloride;
1-[3-(p-methoxyphenyl)-propyl]-4-allyl-4-propionoxy-piperidine, hydrochloride;
1-[3-(3,4-dimethoxyphenyl)-propyl]-4-allyl-4-propionoxy-piperidine, hydrochloride;
1-[3-(3,4,5-trimethoxyphenyl)-propyl]-4-allyl-4-propionoxy-piperidine, hydrochloride;
1-[3-(p-tolyl)-propyl]-4-allyl-4-acetoxy-piperidine, hydrochloride;
1-[3-(p-tolyl)-propyl]-4-allyl-4-propionoxy-piperidine, hydrochloride;
1-[3-(o-tolyl)-propyl]-4-allyl-4-propionoxy-piperidine, hydrochloride;
1-[3-(3,4-methylenedioxy-phenyl)-propyl]-4-allyl-4-propionoxy-piperidine, hydrochloride;
1-[3-(p-chlorophenyl)-propyl]-4-allyl-4-acetoxy-piperidine, hydrochloride;
1-[3-(p-chlorophenyl)-propyl]-4-allyl-4-propionoxy-piperidine, hydrochloride;
1-[3-(3,4-dichlorophenyl)-propyl]-4-allyl-4-propionoxy-piperidine, hydrochloride;
1-[3-(p-fluorophenyl)-propyl]-4-allyl-4-propionoxy-piperidine, hydrochloride;
1-[3-(p-bromophenyl)-propyl]-4-allyl-4-propionoxy-piperidine, hydrochloride.

*Example 2*

14.58 g. of magnesium filings in 25 ml. of abs. ether are placed in a 1500 ml. four-necked flask and a little crotyl bromide (1-bromo-2-butene) is added dropwise. When the reaction has started, 215 ml. of abs. ether are added and the remainder of 27 g. of crotyl bromide is slowly added over 4–5 hours while stirring. The reaction mixture is then stirred for another 30 minutes, 11.3 g. of 1-methyl-4-piperidone in 100 ml. of abs. ether are added in 10 minutes, the mixture is refluxed for 30 minutes, 50 ml. of acetanhydride are added and the yellow suspension is refluxed for another two hours. The mixture is then poured onto ice, acidified with concentrated hydrochloric acid, and the ethereal phase is extracted three times with 6 N hydrochloric acid. The combined acid extracts are made alkaline with concentrated ammonia, extracted four times with chlorofarm, the chloroform solution is dried and concentrated and the residue is distilled. The 1-methyl - 4-(1'-methylallyl)-4-acetoxypiperidine boils at 59–65°/0.05 torr.

The hydrochloride is produced by adding ethereal hydrochloric acid to the solution of the base in abs. ether. It melts at 198° (recrystallised from acetone).

1-methyl - 4-(1'-methylallyl) - 4-propionoxy-piperidine is produced in the same way. Its hydrochloride melts at 207° (recrystallised from acetone/isopropanol).

Example 3

(a) 5.1 g. of magnesium filings in 15 ml. of ether are placed in a 350 ml. flask and a little allyl bromide is added dropwise. When the reaction has started, 60 ml. of abs. ether are added and the remainder of 25.4 g. of allyl bromide are so added while stirring that the ether remains boiling under reflux. The whole is then stirred for another 10 minutes whereupon 11.3 g. of 1-methyl-4-piperidone in 30 ml. of abs. ether are slowly added. After refluxing for 30 minutes, ice is added to the mixture which is then acidified with concentrated hydrochloric acid and the etheral phase is extracted three times with 6 N hydrochloric acid. The combined acid extracts are made alkaline with concentrated ammonia and extracted with chloroform, the chloroform solution is dried and concentrated and the residue is distilled. The 1-methyl-4-allyl-4-piperidinol boils at 60–64°/0.01 torr; the citrate melts at 95–97° (recrystallised from methanol/ether). 1-propyl-4-allyl - 4-piperidine, B.P. 69–76°/0.02 torr, is obtained in the same way.

(b) 7.6 g. of the product of (a) are refluxed for 3 hours with 40 ml. of acetanhydride. The reaction solution is then evaporated in a rotary evaporator, ice is added to the residue which is then made strongly alkaline and extracted five times with chloroform. The chloroform solution is dried and concentrated and the residue is distilled. The 1-methyl - 4 - allyl - 4 - acetoxy-piperidine boils at 112–115°/12 torr; the hydrochloride melts at 167–168° (recrystallised from isopropanol/ether).

1-methyl - 4 - allyl - 4 - propionoxy-piperidine is produced in the same way. The hydrochloride melts at 157–158° (recrystallised from isopropanol/ether).

Example 4

3.5 g. of 1-methyl - 4 - allyl - 4 - piperidol hydrochloride and 250 mg. of p-toluene sulphonic acid are dissolved in 150 ml. of chloroform. Ketene freshly prepared from acetone is passed through this solution (Quedbeck apparatus, Angew. Chemie 68, 369 (1956)). The progress of the reaction is followed by thin layer chromatography (silica gel with 0.5% sodium hydroxide solution, eluant:methanol). No more starting material can be determined after 15 minutes. The solution turns yellow during the reaction and the temperature rises about 40°. The solution is concentrated to half its volume and extracted twice with 100 ml. of 2 N hydrochloric acid each time. The acid solution is made alkaline with sodium carbonate, the product which precipitates is extracted three times with 100 ml. of ether each time, dried with anhydrous sodium sulphate and concentrated. The oily 1-methyl-4-allyl-4-acetoxy-piperidine is converted into the citrate. M.P. of citrate 181°.

Example 5

2 g. of 1-methyl - 4-(2'-propinyl) - 4 - acetoxy-piperidine are hydrogenated at room temperature under normal pressure with 500 mg. of palladium —CaCO₃— lead acetate catalyst and 200 mg. of quinoline. After the calculated amount of hydrogen has been taken up (about 23 minutes), the catalyst is filtered off, the filtrate is evaporated and the residue is distilled. The hydrochloride of 1 - methyl-4-allyl-4-acetoxy-piperidine produced from the distillate melts at 167–168° and is identical with the product produced analogously to example 1.

Example 6

5.64 g. of magnesium in 15 ml. of abs. ether are placed in a Grignard apparatus and 31.3 g. of methallyl bromide are added by first entering 2–3 ml. thereof, and, as soon as the reaction has started, 60 ml. of ether and then the remainder of the methallyl bromide, the latter being added dropwise within 30 minutes. The whole is then refluxed for 10 minutes and the 1-methyl-4-piperidone is added to 40 ml. of ether. After the reaction has subsided, the solution is refluxed for 30 minutes. 50 ml. of propionic acid anhydride in 50 ml. of abs. benzene are then added and the whole is refluxed for 6 hours. Ice and concenetrated hydrochloride are then added, the acid phase is removed and the organic phase is extracted twice with 2 hydrochloric acid. The aqueous extracts are combined, made alkaline with concentrated ammonia, extracted four times with chloroform, dried, evaporated and distilled. The 1 - methyl-4-methallyl-4-propionoxy-piperidine boils under 0.04 torr at 60–65°. The citrate is produced therefrom in the usual way and is recrystallised from methanol when it then melts at 177–178°.

We claim:
1. A compound selected from among a piperidine derivative of the formula

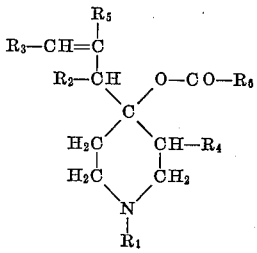

wherein
$R_1$ represents alkyl of at most 8 carbon atoms,
alkenyl of from 3 to 8 carbon atoms, cyclohexyl, phenylalkyl of at most 9 carbon atoms or phenyl alkyl of at most 9 carbon atoms substituted by chloro, bromo, fluoro, lower alkoxy, lower alkyl, or 3,4-methylenedioxy,
each of $R_2$, $R_3$, $R_4$ and $R_5$ represents hydrogen or methyl, and
$R_6$ represents alkyl of from 1 to 2 carbon atoms, and a salt thereof with an acid.

2. A compound as defined in claim 1, wherein $R_1$ is 2'-phenyl-ethyl, each of $R_2$, $R_3$, $R_4$ and $R_5$ is hydrogen, and $R_6$ is methyl.

3. A compound as defined in claim 1, wherein $R_1$ and $R_6$ are both methyl and $R_2$, $R_3$, $R_4$ and $R_5$ are each hydrogen.

4. A compound as defined in claim 1, wherein $R_1$ is n-propyl, each of $R_2$, $R_3$, $R_4$ and $R_5$ is hydrogen and $R_6$ is methyl.

5. A compound as defined in claim 1, wherein each of $R_1$ and $R_6$ is ethyl and each of $R_2$, $R_3$, $R_4$ and $R_5$ is hydrogen.

6. A compound as defined in claim 1, wherein each of $R_1$, $R_2$ and $R_6$ is methyl and each of $R_3$, $R_4$ and $R_5$ is hydrogen.

7. A compound as defined in claim 1, wherein $R_1$ is methyl, each of $R_2$, $R_3$, $R_4$ and $R_5$ is hydrogen and $R_6$ is ethyl.

8. A compound as defined in claim 1, wherein $R_1$ is allyl, each of $R_2$, $R_3$, $R_4$ and $R_5$ is hydrogen and $R_6$ is ethyl.

9. A compound as defined in claim 1, wherein $R_1$ is β-phenyl-ethyl, each of $R_2$, $R_3$ and $R_5$ is hydrogen, $R_4$ is methyl and $R_6$ is ethyl.

10. A compound as defined in claim 1, wherein $R_1$ is benzyl, each of $R_2$, $R_3$, $R_4$ and $R_5$ is hydrogen and $R_6$ is methyl.

11. A compound as defined in claim 1, wherein $R_1$ is n-butyl, each of $R_2$, $R_3$, $R_4$ and $R_5$ is hydrogen and $R_6$ is ethyl.

12. A compound as defined in claim 1, wherein $R_1$ is n-octyl, each of $R_2$, $R_3$, $R_4$ and $R_5$ is hydrogen and $R_6$ is ethyl.

13. A compound as defined in claim 1, wherein $R_1$ is n-propyl, each of $R_2$, $R_3$, $R_4$ and $R_5$ is hydrogen and $R_6$ is ethyl.

14. A compound as defined in claim 1, wherein $R_1$ is β-phenyl-ethyl, each of $R_2$, $R_3$, $R_4$ and $R_5$ is hydrogen and $R_6$ is ethyl.

15. A compound as defined in claim 1, wherein $R_1$ is γ-phenyl-propyl, each of $R_2$, $R_3$, $R_4$ and $R_5$ is hydrogen and $R_6$ is ethyl.

16. A compound as defined in claim 1, wherein $R_1$ is γ-phenyl-propyl, each of $R_2$, $R_3$, $R_4$ and $R_5$ is hydrogen and $R_6$ is methyl.

17. A compound as defined in claim 1, wherein $R_1$ and $R_2$ are methyl, each of $R_3$, $R_4$ and $R_5$ is hydrogen and $R_6$ is ethyl.

18. A compound as defined in claim 1, wherein $R_1$ is β-phenyl-ethyl, each of $R_2$, $R_3$ and $R_5$ is hydrogen, and each of $R_4$ and $R_6$ is methyl.

19. A compound as defined in claim 1, wherein $R_1$ is phenyl-alkyl.

20. A compound as defined in claim 19, wherein said phenyl-alkyl is benzyl.

21. A compound as defined in claim 1, wherein said phenyl-alkyl is substituted by a substituent selected from among chloro, bromo, fluoro, lower alkoxy, lower alkyl, and 3,4-methylenedioxy.

References Cited
UNITED STATES PATENTS

| | | | |
|---|---|---|---|
| 2,798,073 | 7/1957 | Lee et al. | 260—294.3 |
| 3,081,309 | 3/1963 | Prost | 260—294.3 |

JOHN D. RANDOLPH, *Primary Examiner.*

WALTER A. MODANCE, *Examiner.*

A. D. SPEVACK, *Assistant Examiner.*